April 4, 1972  A. F. FRASER  3,654,050
FABRICATED STRUCTURE OF IMPROVED EXPANDABLE
DIMENSIONAL PRECISION AND METHOD
Filed Oct. 6, 1969  2 Sheets-Sheet 1

INVENTOR.
ALLISTER F. FRASER,
BY
Alton V. Oberholtzer

ATTORNEY.

United States Patent Office 3,654,050
Patented Apr. 4, 1972

3,654,050
FABRICATED STRUCTURE OF IMPROVED
EXPANDABLE DIMENSIONAL PRECISION
AND METHOD
Allister F. Fraser, Santa Barbara, Calif., assignor to Hughes Aircraft Company, Culver City, Calif.
Filed Oct. 6, 1969, Ser. No. 863,888
Int. Cl. B65h 81/04
U.S. Cl. 161—17                                10 Claims

ABSTRACT OF THE DISCLOSURE

The method of preparing improved collapsible expansible and rigid or reinflatable, rerigidizable fiber wound structures forming inflatable units of relatively uniform expanded and re-expanded dimensional precision in erected rigid states by using an isotensoid-geodesic design of fibers in predesigned, nonstressed fiber relationship and impregnating the same with a space hardenable impregnate and preferably a multicurable impregnate, which impregnated fabric upon fashioning, after collapsing and upon expansion, to the cured form, provides lightweight, close precise structure of rigidized dimensional precision.

---

The application relates to the discovery and use of a fiber design improvement and combination of impregnate therefor providing an inflatable core which from a collapsed state to an expanded state produces uniformly dimensioned expanded rigidized fiber wound structures, and method of providing for same.

More particularly, the improvement herein relates to a method of providing lightweight impregnated isotensoid fiber structure of expandable uniform dimensional precision, when rigidized, after collapsing and inflation, and preferably providing uniformly sized ground and air space application of fabricated reversible hardening structure. Thus, for the first time affording the art with means for completely testing expandable prefabricated structure with assurance of close tolerance in expanded dimensional size before application in use of the same and copies thereof.

KNOWLEDGE IN THE ART

The art has heretofore provided much literature on rigidized fabric structure impregnated with resinous and glue materials which when once set to a solid state, remains solid. Such structures are provided primarily as laminate or sandwich layers impregnated with inflatable material and subsequently setting of the impregnate by either a final chemical reaction or a finalized physical change in the impregnate.

Recently there has been invented or discovered and developed a gelatin impregnate whereby fabrication of lightweight laminate rigid sandwich structures can be realized (Note: J. Spacecraft No. 4, April 1966, page 513–518, and Schwartz et al., Pat. No. 3,497,378, the impregnate therein included herein by reference thereto).

With all the fabrics and laminates known and tested, including glass cloth laminates, the dimensional accuracy of the erected cured structures varied. This condition was present even though the initial structures were of an original same size measurement, and accordingly were of poor dimensional precision upon inflation. Thus, providing prefabricated beams, columns, panels, tubes, domes, and other structures of irregular and poor dimensional precision upon ultimate erection. Consequently, the problems involved not only a requirement of a suitable impregnate, but also providing properly prefabricated, collapsible, expandable, rigidizable and rerigidizable structure having uniform dimensional size not only upon first expansion but upon one or more repetitions of collapsing, expansion and rigidization. That is, the obstacles and problems in the art were to provide a collapsible fabricated structural fabric which is stable in its design form in conjunction with expansion and rigidization. Thus, merely impregnating and expanding a conventional fabric provided no determinable assurance of its size in actual application.

OBJECTS OF THE INVENTION AND IMPROVEMENT PROVIDED HEREIN

It is an object of this disclosure to provide the art with a method of making expandable impregnated fabrics of an isotensoid design of wrap for providing axisymmetric pressure vessels thereof of predetermined size and shape capable of being expanded and rigidized upon applications of erecting forces, as internal pressure, with obtaining and retention of correspondingly uniform expanded dimensional construction precision after collapsing, expansion and rigidization, or maintain a uniform size dimension after one or more or a plurailty of such collapsing and rigidizations, and the articles produced thereby.

It is another object of this disclosure to provide the art with a method of producing a fiber structure forming axisymmetric pressure vessels of arbitrary size and shape preferably impregnated with a rerigidizable impregnate and capable of being rigidized after collapsing and subsequent expansion with retention of close dimensional precision upon expanded rigidization, and the expanded article product thereof.

A further object of this invention is to provide an improvement in the method of preparing for test purposes, or ultimae use, inflatable structures of predetermined expanded dimensional size precision utilizing an isotensoid or defined geodesic fiber design in combination with an expandable free space rigidizable plastic impregnate and the articles produced thereby.

MODE OF EMBODIMENT

The best mode of describing a specific embodiment of the process in operation or principle of application affording prefabricated expandable spheres, cones, ellipsoids and parabolas shapes as erectable products of the character of booms, beams, columns, panels, tubes, trusses, reflectors and collectors, shelters, domes, and heat shields, including antennas and the like, which overcome the dimensional expanded inaccuracies of the present fabrics in fabrication of deployable ground and space hardening structures, and particularly for multiple collapsing and rerigidizations, is illustrated in the following description in conjunction with the accompanying drawings wherein:

The following is illustrative of providing impregnated expansible beams, cylinders, spheres, cones, parabolic, elliptic, and the like structural forms of isotensoid fiber structure design, or fiber wrap patterns. The patterns have geodesics on surfaces of revolution of the form $r \cos \alpha = R \cos \beta$ where $\alpha$ is the inclination of the geodesic to the line of latitude which has radial distance $r$ from the axis of revolution and $\beta$ is its inclination to a specified line of latitude of radius R. Such structure is provided without shear stress at fiber intersection throughout the major body portion of the body structure and impregnated with a rigidizable or preferably rerigidizable plastic. The preferred plastic being capable of collapsing and reinflation, or providing reversibly hardenable fabric structures of relative precise tolerances. The following illustrated boom structure, its method production and its impregnation, as herein provided, is exemplary.

Figure 1:
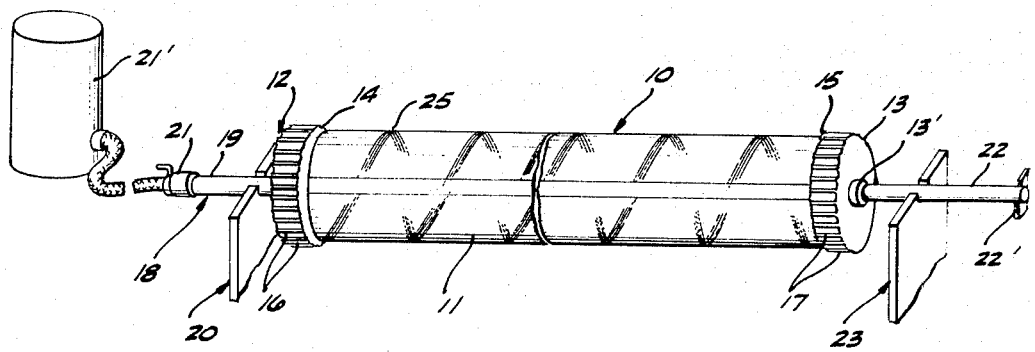
FIG. 1 is an isometric plan view of a process of filament winding setup as embodied herein.

As illustrated in FIG. 1, there is provided an expansible bladder mandrel 10 formed of conventional poly (ethyleneglycol terephthalate) of a predetermined size and shape, for example, as a tube or other inflatable bladder form, as desired. In the illustrative embodiment, the bladder or tube 10 is initially prepared by forming an expansible tubing of polymerized poly(ethylenglycol terephthalate) or other inflatable synthetic resin, rubber and the like material on a suitable mandrel or otherwise in appropriate form and in a conventional manner. For example, the inflatable bladder form, or tube 10 provides a mandrel for the fiber wrap pattern and can be prefabricated as by spray application of suitable rubber or resinous material, onto a shaped forming mandrel. In the present embodiment, the inflatable mandrel 10 is provided by a prefabricated plastic film of poly(ethylenegly-col terephthalate) in sheet form 11 wrapped about a shaping mandrel, placing a film or coating of conventional thermosetting polyester adhesive, as a conventional glycol and acid combination, between the overlapping edges and heat sealing by hot iron pressing at about 300° F. until the normally opaque film became uniformly clear. The shaping mandrel in this example was a 3 inch diameter cylinder 48 inches in length providing a tube design fabrication of the expansible bladder 10 of 3 inch diameter and 48 inches in length.

Otherwise, the same or other suitable inflatable flexible plastic as rubber, vinyl, polyethylene, and the like may be utilized in the size and shape desired, formed on or by a suitable forming mandrel to provide a collapsible, expansible mandrel about which the fabric wrap of uniform isotensoid design, as herein provided, can be bonded.

After the flexible inflatable mandrel form is prepared, it is preferably removed from the forming mandrel and the ends closed by apertured hubs or caps 12 and 13. These hubs or caps 12 and 13 are of light metal as aluminum, although they may be of molded resin compositions with the apertured portions 12' and 13' internally or externally threaded (not shown) to provide for interconnecting or attachment means for mounting and fastening or otherwise connecting a series of the like and other solid or expanded rigidized structures in connected relationship thereto (not shown).

The hubs 12 and 13, as indicated, are provided with suitable peripheral flanges 14 and 15, respectively, which are fitted over the ends of the collapsible bladder or tube 10 and are sealed in an airtight relationship thereto. In the instant case, the flanges of the aluminum hubs 12 and 13 were bonded to the inflatable bladder mandrel 10 ends with a conventional polyester adhesive film (as of the glycol-acid combination) set with a sealing iron at approximately 300° F. and moderate pressure until the normally opaque film became uniformly clear. Otherwise, any known suitable thermosetting plastic or bonding adhesive material of the character of polyester, rubber, synthetic rubber, or epoxy resin (as epichlorohydrin or bisphenol A and diethylene diamine curing agent) may be utilized. In the case of the tube seam, a conventional flexible adhesive to permit collapsing is preferred whereas the tube end caps and filament or thread end wrap thereover (as provided) may be secured by nonflexible conventional bonding adhesive. The outer peripheral circumference of the flange areas 14 and 15 are prefabricated with a number of equally spaced ribs or a number of indexing points as 16 and 17, respectively. Such indexing points 16 and 17 provide an accurate control of spacing the helical fiber wrap, including serving as guides for spaced longitudinal wrap and for sealing the wrap ends of the fiber material at the terminal ends of the wrap structure with a suitable resinous or plastic adhesive, as indicated. The suitable bonding adhesive therefor is any conventional bonding agent, as polyester resin, synthetic rubber adhesive, epoxy resin, and the like, which does not soften under operative conditions and firmly bonds the terminal ends of the fiber wrap and inflatable mandrel structure 10 to the terminal end hubs or caps 12 and 13.

With the ends of the flexible mandrel 10 firmly bonded to the flanges 14 and 15 of end hubs or caps 12 and 13, respectively, an elongated hollow tube 18 (of aluminum or other suitable metal or plastic) of about 1.0 inch diameter and containing one or more apertures therein (not shown) is centered through the hub apertures. The flexible mandrel 10 is then extended therealong (48 inches) or to the predetermined full length thereof and the apertured hub areas surrounding the tube 18 filled with an air sealing bonding agent, as a conventional polyester, as a glycol-acid mixture, or other suitable conventional setting plastic, epoxy, rubber, and the like bonding agent, to provide an airtight seal and an air expandable mandrel.

As illustrated in FIG. 1, the one extended end 19 of tube 18 is supported by a fixed bracket 20, or other suitable support, and rotatably connected, by conventional fitting means 21, to a constant air source 21' (diagrammatically illustrated). Conventional air valve or suitable control means X is provided. The other tube end 22 is closed by a suitable cap or other plugging means 22' and supported by suitable means as fixed bracket 23. The extended end 22 provides a means for turning the mandrel by hand or attachment of a crank or other suitable conventional mechanical turning means as a drive shaft or powered wheel and pulley means (not shown).

Having the mandrel setup, it is loaded by constant internal pressure of 3–4 p.s.i. from air source 21', or pressure sufficient to deploy the mandrel as a pressure vessel to its final form and hold it there until wrapped.

To illustrate, fabrication of structure, as herein described, I used a conventional continuous fiber 25 of unimpregnated fiber glass (end count 8) of .00038 inch average diameter having an amino silane finish (polyester and epoxy resin compatible) it was determined that in the fabrication of the exemplary structure provided, that each helical wrap about the expanded mandrel 10 would be 95.988 inches long and require 8.820 revolutions preferably using $+\not< 60°$ and $-\not< 60°$ helical guidelines measured from a meridian with the dimensions of one helix being

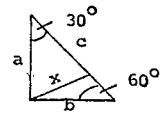

wherein:
$a = 9.425$ inches (pi by 3.000 diameter)
$b = 5.442$ inches
$c = 10.883$ inches length of one helix (8.820 revolutions by 10.883 inches=95.988 inches)
$x = 4.71$ inches width of helix and the number of wraps 36 at $+60°$ and 36 at $-60°$, all equally spaced circumferentially, and with 18 equally spaced longitudinal lengths 26, fastened to end hubs 14 and 15, and overlying and reinforcing the helical wrap design. In the structure exemplified, 18 longitudinal lengths were used. For purposes of illustration and exemplification, it will be understood that the helical fiber windings and overlaying horizontal fibers are shown, for purposes of demonstration, only in part, as in the finished product the helical winds are in side by side close proximity, comprising a substantially equal number of wraps in each direction, and in the finished state coated with a rigidizable plastic. The helical wraps are of predesigned inclination at any one point and in the overall. More or less different suitable selected fibers may be utilized, at relatively more or less different angles of free crossing, or side by side relationship, with different and overall varying radial distances from the axis of revolution, in combination with differences in helix angles, dependent on the size and shape of the prefabricating mandrel about which the re-expandable design of fiber wrap is prefabricated. Otherwise modifications in the number windings, the angle of wrap, and overlying reinforcing may be changed to other numbers by utilizing and satisfying the isotensoid and geodesic design wrap and impregnating the wrap with an expansible setting impregnant prepared on a prefabricated mandrel.

Having the design pattern and above calculations, one of the hubs was rotated 0.820 of a revolution (or 295.2 degrees) with respect to the other and secured in place. This facilitated starting and ending a helical wrap on the same index member to provide a stable preselected wrap pattern which is structurally stable in fixed design shape upon collapsing and re-expansion. To initially facilitate wrapping, the mandrel 10 was marked with a pattern in the exact dimensions of the total helix.

In the method of application, one end of the continuous fiber 25, as shown in FIG. 1, was attached to an index point, as at 16, and, while held under uniform tension (manually or mechanically) the mandrel turned to wrap the fiber about the mandrel. As the mandrel 10 is turned, the fiber is wrapped thereabout in one direction with simultaneous aligning of the fiber with the guidelines as laid out with the pattern of the helix. Following the pattern and catching the starting and turning end of the fiber wrap about a similarly identified indexed rib as number 17 at the opposite end of the mandrel 10 and bringing the fiber back in a side by side relationship with repetition and progressively using the next spaced rib or index points as the wrap continued, provided the patterned design of helical fiber wrap about the expansible mandrel. As will be apparent, one or more overlying wraps of a suitable fiber can be provided about a base (mandrel) as herein provided, and with or without one or more other suitable end closure means, or suitable inlet and outlet means, in forming containers and other desirable contoured structures. For example, as herein exemplified, including forming a container by a continuous fiber wrap of the design provided with proper inlet and outlet means extending through the prefabricated wall, as an insertion, before or after prefabrication of the design wrap.

In order to set the fibers in place and provide for collapsing and re-expansion of the mandrel 10, the first wrap is preferably coated and saturated with a gelatin preparation of:

| | Parts |
|---|---|
| Water | 200 |
| Gelatin | 100 |
| Thiourea | 15 |
| Fungicide | 0.3 |
| Wetting agent | 0.3 |

In preparation, the dry gelatin was placed in a container and water added. The container was heated to 120° F. for a period of hours until the gelatin was dissolved. Then other ingredients were added and the mixture maintained in a temperature bath until ready for application. The fungicide may be any suitable compatible agent that destroys spores and fungi, as Bordeaux mixture, arsenicals, etc., or otherwise suitable compatible insecticides as prethrum, kerosene, soluble fluosilicates and soluble fluorides including preferably "Dowcide G," or other suitable commercial product. The wetting agent may be any suitable and compatible wetting agent effecting improved adhesion of the gelatin solution to the filament or fiber wrap design, a preferred wetting agent is a conventional sulphonated bicarboxyacid ester commercially available as "Aerosol."

Figure 2:
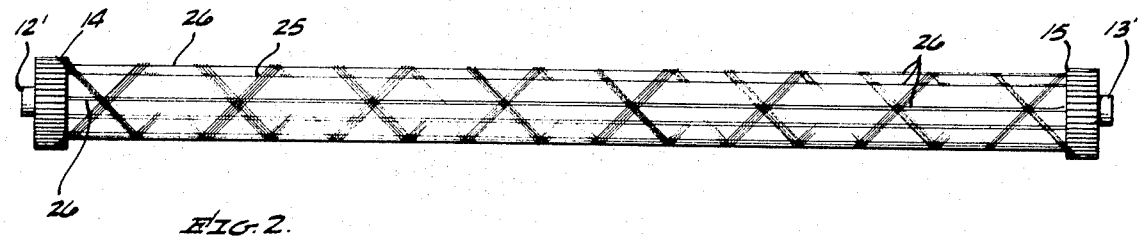
FIG. 2 is a multiple expansible isotensoid structure of precisional and close dimensional expanded shape and size, shown in partial winding form as embodied herein.

After the one directional wrap 98 yards at +60 degrees was completed, the above gelatin solution was applied by brushing thereon until the filament or fibers appeared saturated and the voids filled. After drying, the reverse order —60 degrees, or cross-layer or fibers was wrapped about the mandrel utilizing the same index pattern and yardage. This provided a double layer of crossed filament to which was applied another coating of the gelatin solution until the fabricated wrap appeared saturated and the voids filled. Thereafter, a number of longitudinal parallel filaments 26 were tautly secured over the prefabricated design wrap and caught at the ends of the flexible mandrel by attachment to the ribs or index points 16 and 17 as partially illustrated in the expanded structure of FIG. 2 and collapsed form in FIG. 3.

After the longitudinal fibers 26 were in place, another bruhed on coating of the gelatin solution was applied until all the fiber strands were thoroughly wetted and void areas between the fibers appeared filled. The turned or relative fiber ends were securely bonded at their indexing points to the ends caps 12 and 13 respectively. As indicated, such bonding adhesive may be a conventional polyester or epoxy resin.

The wet gelatin treated fabrication was air-dried until a hard appearance was noted (about 18 hrs.). The assembly was then "B staged" treated, under normal prefabrication pressure, in a formaldehyde vapor environment for 24 hours, to obtain proper conditioning evidenced by non-tackiness and a rubbery-slippery texture. This "B stage" vapor treatment was accomplished in an airtight polyethylene "tent" constructed about the prefabricated structure and heating therein a 10% solution of 37% formalin at 160° to 180° F. to produce the vapors.

Figure 3:
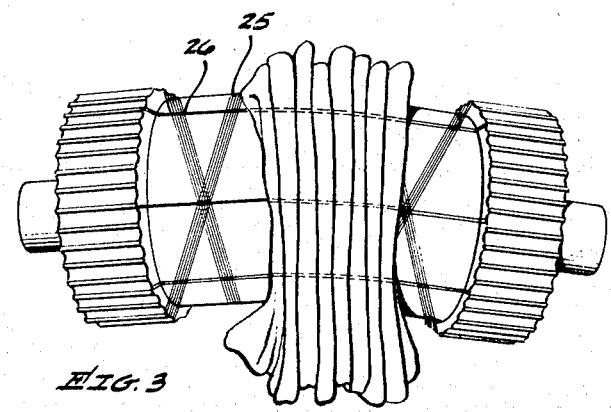
FIG. 3 is an isometric view of the prepared structure of FIG. 2 exemplary of a prefabricated structure in collapsed form.

After "B-staging" and removal of the center tube 18, the prefabricated structure can be collapsed, as illustrated in FIG. 3, for packaging and transportation. However, for testing purposes, upon re-expansion by use of internal gas pressure, and rigidizing under atmospheric conditions, in about 12 to 24 hours, depending upon relative humidity, the structure exhibited remarkable dimensional precision by duplication of original length within ±0.015 inch of its fabricated length after multiple cycles of collapsing, inflation and rigidization.

A further illustration of lightweight expandable structures of uniform and established dimension, having an isotensoid-geodesic design wherein fibers lie along a geodesic pattern forming an axisymmetric shell whereon their principal curvatures can be expressed as a function of the radial coordinate measured from the axis of symmetry. The fibers are wrapped under the same tension across the intersections as exemplified by the shell cone and sphere structures of FIGS. 1–5, respectively.

Figure 4:
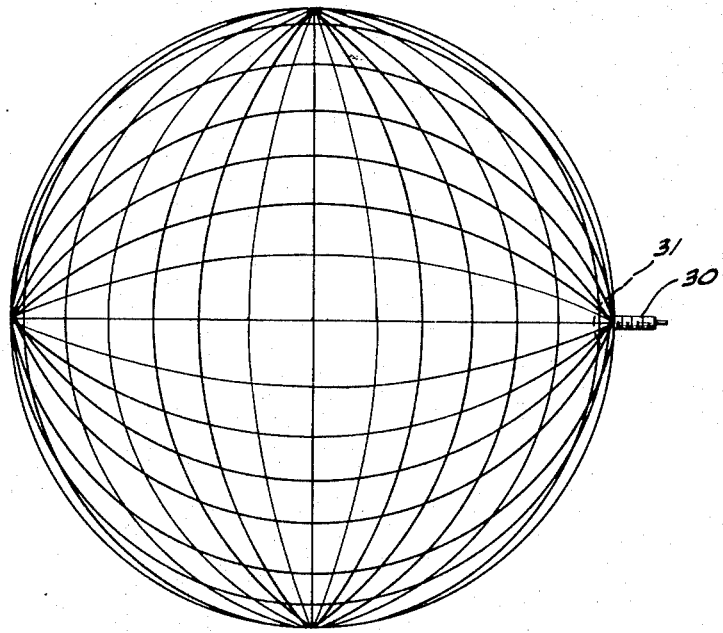
FIG. 4 is illustrative of an expansible sphere form of partial prefabricated geodesic fiber design.
Figure 5:
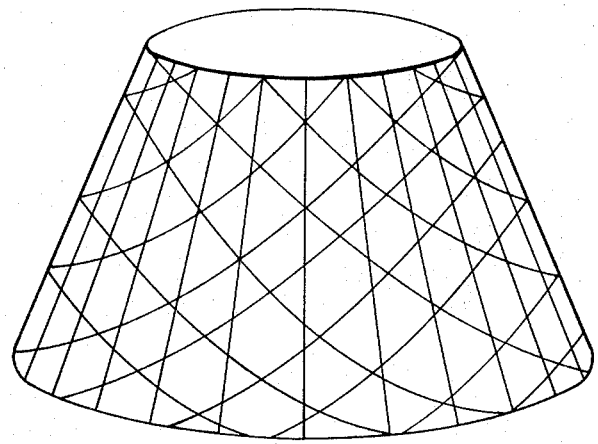
FIG. 5 is illustrative of a partial cone form of prefabricated geodesic fiber design in fabrication of structure as embodied herein.

For purposes of illustration, each of the structures is shown in partial form to illustrate the fiber wrap. This wrap is preferably about an inflatable core, as illustrated, and the structures adapted to be closed at their respective ends by suitable closure means, for example, as illustrated, or with a conventional pressure inlet and outlet valve 30, with or without threaded or other attachment means as illustrated in FIG. 4. The base 31 of the valve means 30 may underlie the fiber wrap or be attached by suitable means to the inflatable core, with or without the design of fabricated fiber wrap serving as a continuous filament or relative end closure. In this respect, modified inflatable impregnated fiber wraps can be prefabricated of continuous filament in the design provided and pressure inlet and connecting or attachment means connected thereto before or after impregnation. Otherwise, a collapsible said design form of bonded fiber wrap can be provided and subsequently impregnated by saturation with a suitable expandable, space hardenable impregnate, and the impregnated collapsed form subsequently expanded by use of known inflation means and hardened to its design form.

Hereby, by special wrap and impregnation there is particularly and preferably provided deployable space hardening structure of expandable uniform size and dimension free of distorting forces, particularly at attach points located at intersections of the fibers. Such forces normally warp the structure from its intended expanded size and shape. The repeatable accuracies in deployable length of at least four parts in 1000 in terms of other known inflatable performance were phenomenal.

Thus, is provided a prefabricated design for fabrication of boom structure, 2 and 3 dimensional truss structure, antenna support (slotted array), antenna structure (helical), reflectors and collectors (parabolic antenna and parabolic solar energy collector), manned space shelters, protected space storage volume, ejectable wing tip tanks, inflatable entry and re-entry heat shields, ground structure including portable 6 to 10 foot variety strategic antennas, and the like structure. The adaptation thereto of the fiber design, in one or more crossing layers, and suitable impregnate enclosing the expansible mandrel with suitable end caps, utilizing the principle of filament wrap and impregnation for providing like expandable structures will now be apparent. Less preferably, other and substitute modified structure of expansible core forms utilizing the impregnated fiber design, with or without, an inflatable lining can now be provided wherein the impregnate serves as the expansion pressure retaining means at least until the vessel-like expanded structure hardens.

In packaging, the preferred gelatin saturant is preferably maintained in a plastic state by storage of the structure in a sealed container of water vapor atmosphere or other plasticize as ethylene glycol, glycerine and the like having an adequate vapor pressure. While brushing of the impregnate is most feasible during fabrication, the impregnate is also applicable by pre-saturation or soaking, with spray or dip during or after application of the wrap. Further, where the design fabric structure requires only one rigidization after collapsing and re-expansion, the art's systems of polyester, polyurethane and other of the art's suitable earlier impregnants may be utilized with appropriate application. Further, such saturant and coating materials including modification of the gelatin as described in the above application, with appropriate modification may be utilized with the expandable design structures herein provided.

As exemplified with the preferred gelatin impregnant, which is space hardenable upon expansion and normal exposure, the prefabricated rigid structure is rendered reflexible and collapsible by enclosure in a moist impregnating atmosphere, as within a tent or like enclosure (not shown). The preferred relatively lightweight rerigidizable structures permit complete testing before actual application and provide for dimensional precision upon repeated deployments and rigidizations. Otherwise, copies of collapsed duplicates of the test models may be prefabricated as relatively economical expendable items of manufacture. This is with greater assurance of size precision upon expansion.

Having described the present embodiments of my discovery in accordance with the patent statutes, it will now be apparent that some modifications and variations may be made as provided herein without departing from the spirit and scope thereof. The specific embodiments described are provided by way of illustration and are illustrative of my discovery, invention or improvements which are to be limited only by the terms of the appended claims.

What is claimed is:

1. An impregnated and expansible fiber wall structure with a main body portion of precisely expandable and hardenable predetermined dimension and size having a helical design wrap of fibers in one or more crossing layers having their principal curvature and surfaces of revolution in the design wrap form $r \cos \alpha = R \cos \beta$ where $\alpha$ is the inclination of the line of latitude, $r$ is the radial distance from the axis of revolution and $\beta$ is inclination of the fibers to a specified line of latitude of radius R, said fibers being free of shear stress and distorting forces at points of intersection in said main body portion and coated with an environment hardening plastic.

2. The structure of claim 1 wherein said structure is in an expanded hardened form and provided with interconnecting and attachment means fastened to the said wall structure.

3. The structure of claim 1 wherein the coating is a space hardenable rerigidizable gelatin.

4. The structure of claim 1 wherein the helical wrap is of a design using substantially $+ \measuredangle 60°$ and $- \measuredangle 60°$ helical guidelines.

5. The structure of claim 1 containing an inflatable plastic core and having inlet and outlet means extending through the said wrap.

6. The structure of claim 1 wherein the dimensions of one helix of the design is on the order of:

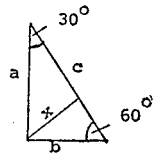

wherein
$a = 9.425$ inches
$b = 5.442$ inches
$c = 10.883$ inches
$x = 4.71$ inches and the number of wraps are substantially equal in number in opposite directions of design and the coating is a rigidizable plastic.

7. The structure of claim 6 provided with a number of longitudinal filaments overlying the helical wraps and the said plastic is a rerigidizable gelatin.

8. The method of building a collapsible fiber structure of precisely expansible dimensional precision when in an erected state comprising the steps of providing an expanded mandrel, wrapping about said expanded mandrel a filament in plus and minus helical design form of $r \cos \alpha = R \cos \beta$, wherein $\alpha$ is the inclination of the line of latitude, $r$ is the radial distance from the axis of revolution and $\beta$ is the inclination of the filament to a specified line of latitude of radius R, securely bonding said filament at the starting and ending of the helical wraps, and saturating and filling the helical filament wraps between the ends thereof with a space hardenable plastic.

9. The method of claim 8 wherein the helical guidelines are on the order of $+ \measuredangle 60°$ and $- \measuredangle 60°$.

10. The method of claim 8 wherein the space hardenable plastic is a gelatin material.

References Cited

UNITED STATES PATENTS 2,614,058  10/1952  Francis _____ 138—Fiber Glass
3,366,522  1/1968  Underwood __ 138—Fiber Glass

OTHER REFERENCES

Keller et al., "Space Rigidized Resin Fiberglass Sandwich Materials," 1966.

Pipkin et al., "Minimum-Weight Design for Pressure Vessels Reinforced with Inextensible Fibers," 1963.

CARLTON R. CROYLE, Primary Examiner

R. J. SHER, Assistant Examiner

U.S. Cl. X.R.

117—126 GR, 164; 161—47, 48, 139; 156—170, 175, 180; 138—DIG. 2